United States Patent Office 3,471,435
Patented Oct. 7, 1969

3,471,435
REINFORCED POLYMERIC COMPOSITIONS AND PROCESS OF PREPARATION THEREOF
Robert E. Miller, Ballwin, Mo., assignor to Monsanto Company, St. Louis, Mo., a corporation of Delaware
No Drawing. Continuation-in-part of application Ser. No. 333,680, Dec. 26, 1963. This application Sept. 27, 1967, Ser. No. 671,099
Int. Cl. C08f 45/04, 1/84; C08k 1/84
U.S. Cl. 260—37         14 Claims

ABSTRACT OF THE DISCLOSURE

Polymeric composition comprising polymer, inorganic filler and a carboxylalkenyl halosilane of the formula

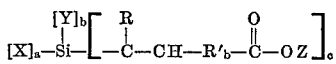

wherein X is a halogen radical, Y and Z are selected from the group consisting of hydrogen and hydrocarbyl radicals, R is selected from the group consisting of hydrogen and alkyl radicals, R' is an alkylene radical, $a$ is an integer from 1 to 3, $b$ is an integer from 0 to 2, $c$ is an integer from 1 to 3, provided that the sum of $a+b+c$ equals 4, and $d$ is an integer from 0 to 1. Also described is a process for preparing the above compositions comprising mixing monomer, filler and coupler and conducting a polymerization of the monomer.

CROSS REFERENCES TO RELATED APPLICATIONS

This application is a continuation-in-part of patent application Ser. No. 333,680, filed Dec. 26, 1963, now U.S. 3,369,036.

BACKGROUND OF THE INVENTION

It is well known in the prior art that polymeric compositions can be "filled" with non-polymeric substances, i.e. materials which do not enter into the polymerization process can be mixed with the monomer feed or polymer product to form a uniform finished product. Initially, various fillers were used in a polymeric material to color the polymer, change the coefficient of expansion, improve abrasion resistance, modulus, and strength, and to dilute the polymer thereby lowering its cost. It is common practice to admix a filler and polymer in several ways in order to effect a mechanical bond between the two components. One method has been to mix thoroughly a monomer and filler and subsequently polymerize the monomer, thereby producing a composition wherein the filler is intimately dispersed throughout the finished product. Another method has been to subject uncured polymer and filler to a sheairing force whereby the filler is forced into a type of mechanical bond with the polymer upon curing. Various other methods of achieving mechanical bonding of filler to polymer are also well known in the art.

The upper limit of filler that can be used in such mechanical mixtures without adversely affecting the mechanical properties of the product is low. The tensile and flexural strengths, particularly of some polymer systems, fall off sharply at relatively low concentrations of filler. An exception to this generalization has been the use of fibrous material, particularly fibrous glass particles, in polymeric compositions. Incorporation of fibrous glass into a polymer increases physical properties significantly. As yet, marked improved has not been achieved by the use of particulate material. The decrease in strength exhibited by particulate filled polymers is believed to be due to the fact that a particulate filler in a polymer is not a component comparable to the polymer in load-bearing characteristics. Rather the polymeric constituent is primarily determinative of the tensile and flexural strengths and moduli of the composition. Therefore, a filled polymeric product, which contains less polymer per unit volume of the product than an unfilled polymer, ordinarily possesses mechanical properties inferior to the unfilled polymer, particularly at particulate filler concentrations of about 50% or more. Nevertheless, several polymer filler systems have been developed for various reasons, such as cost reduction, heat resistance, etc.

It has now been discovered that by achieving improved, adherent bonding of polymer and particulate inorganic filler, the inorganic material no longer acts as a mere filler, decreasing the mechanical properties of the polymer, but rather causes a substantial improvement in the mechanical properties of the polymeric composition.

This reinforcement of polymeric compositions by means of particulate filler as distinguished from fibrous particles is a desirable feature since a particulate filler-monomer or prepolymer mixture is more fluid, hence more easily cast or molded, than a mixture containing an equivalent amount of fibrous material. However, reinforcement by means of fibrous materials, such as fibrous glass, which are adherently bound to polymers through a coupling agent, is also a significant feature of this invention.

It has been discovered that reinforcing agents, when adherently bonded to polymers, provide compositions with mechanical properties superior to compositions wherein the reinforcing agent is merely physically intermixed with the polymer. Consequently, coupling agents capable of forming this chemical bond are important components of a reinforced polymeric composition. It has also been discovered that various compounds used as coupling agents provide compositions of varying degrees of reinforcement as evidenced by mechanical properties of the finished products. Variation in degrees of reinforcement is even more pronounced when the properties of wet compositions are measured. Some polymeric compositions lose nearly all of their increased strength when tested after a four hour boil in water.

SUMMARY OF THE INVENTION

This invention relates to reinforced polymeric compositions. One aspect of the invention pertains to a method for preparing reinforced polymeric compositions comprising:

(1) contacting a carboxylalkenyl halosilane with an inorganic filler to prepare a filler adduct, and
(2) conducting a polymerization of a monomer reactive with carboxylalkenyl group in the presence of said adduct.

Another aspect of the invention peretains to reinforced polymeric compositions comprising a polymer reactable with carboxyalkenyl groups or formed from a monomer reactable with carboxyalkenyl groups, an inorganic filler and a carboxylalkenyl halosilane of the formula:

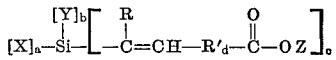

wherein X is a halogen radical, Y and Z are selected from the group consisting of hydrogen and hydrocarbyl radicals, R is selected from the group consisting of hydrogen and alkyl radicals, R' is an alkylene radical, $a$ is an integer from 1 to 3, $b$ is an integer from 0 to 2, $c$ is an integer from 1 to 3, provided that the sum of $a+b+c$ equals 4, and $d$ is an integer from 0 to 1.

A principal object of this invention is to provide reinforced polymeric compositions. Another object of this invention is the provision of reinforced polymeric compositions having increased wet strength and modulus. A still further object of the invention is to provide a method for reinforcing polymeric compositions. Additional objects, benefits, and advantages will become apparent as the detailed description of the invention proceeds.

Carboxylalkenyl halosilanes according to the present invention are depicted by the following generic formula:

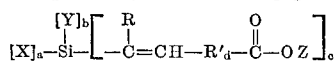

where X is a halogen radical, R is a hydrogen or alkyl radical, R' is an alkylene radical, Y and Z are hydrogen or hydrocarbyl radicals, $a$ is an integer from 1 to 3, $b$ is an integer from 0 to 2, $c$ is an integer from 1 to 3, provided that the sum of $a+b+c$ equals four, and $d$ is equal to zero or one. Examples of compounds include: methyl ester of 6-(phenyl-diiodosilyl)-5-hexenoic acid; isopropyl ester of 3-(tribromosilyl)acrylic acid; n-butyl ester of 3-(ethenyldichlorosilyl)-2-tetradecenoic acid; cyclohexyl ester of 5-(diethylfluorosilyl)-4-nonenoic acid; phenyl ester of 3-(trichlorosilyl)acrylic acid; allyl ester of 3-(methyldifluorosilyl)-2-butenoic acid; p-tolyl ester of 3-(methyldichlorosilyl)acrylic acid; and 4-(ethyldifluorosilyl)-3-decenoic acid.

Compounds included in the above formula which are preferred as coupling agents include compounds of the formula:

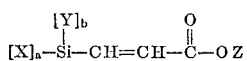

where X is a fluoro, chloro, or bromo radical, Y and Z are alkyl radicals, $a$ is an integer from 2 to 3, $b$ is an integer from 0 to 1, provided that the sum of $a+b$ equals 3. Examples of preferred compounds include: ethyl ester of 3-(methyldifluorosilyl)acrylic acid; n-propyl ester of 3-(tribromosilyl)acrylic acid; isobutyl ester 3-(trichlorosilyl)acrylic acid; and 3-(ethyldichlorosilyl)acrylic acid. The esters, i.e. those compounds where Z is not a hydrogen atom, are preferred coupling agents in base-catalyzed polymerizations to avoid excess consumption of catalyst in neutralizing the free carboxylic acid. In other polymerizations, the acid and ester compounds can be used interchangeably. Since the acids and esters are interchangeable for most purposes, the term "carboxyl group" as used in this disclosure and appended claims is used to refer both to carboxyl groups, —COOH, and to hydrocarbyloxycarbonyl groups, —COOR, where R is a monovalent hydrocarbon radical.

Compounds described above are prepared by reacting a halosilane or a hydrocarbyl halosilane, with an alkynoic acid or alkynoic ester. The reaction can be conducted in the presence of a catalyst containing a metal of the platinum metals series or palladium metals series. Preferred catalysts include platinum or palladium on carbon or salts or acids of the metals such as chloroplatinic acid, $H_2PtCl_6 \cdot 2H_2O$, and ammonium chloropalladate,

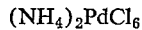

The silane reactant must contain at least one halogen atom and at least one hydrogen atom, both of which must be attached directly to the silicon atom. The remaining two valence bonds of the silicon can be satisfied by additional halogen or hydrogen radicals and/or by hydrocarbyl radicals. The presence of one or more hydrocarbyl radicals serves to change the rate of reaction between the halosilane and alkynoic acid compound, to change the yield of the product, and to modify the extent and strength of chemical bonds formed between the coupler product and mineral reinforcing agent. The hydrocarbyl radical itself is involved in neither the silane-alkynoic acid reaction nor in the coupler-mineral reaction and hence can be any unreactive substituent. Since alkyl halosilanes are easily prepared, and since alkyl groups do not interfere with the coupling reaction, preferred hydrocarbyl substituents are alkyl radicals. Examples of silanes suitable for the preparation of carboxylalkenyl halosilanes of this invention include: trichlorosilane, triiodosilane, chloro-bromo-ethylsilane, dichlorosilane, fluorosilane, methyldichlorosilane, phenyldichlorosilane, and ethenyldibromosilane.

The alkynoic acid reactant can be either the free acid or an ester derivative. The ester substituents are hydrocarbyl radicals such as alkyl, cycloalkyl, aryl, alkaryl, or aralkyl radicals, and preferably alkyl radicals having up to eight carbon atoms. The alkyne chain attached to the carboxyl group can be either straight or branched and can have the acetylenic bond located at any point within the chain. Although propiolic and butynoic acid compounds are preferred reactants, the acetylenic chain is definitely not limited to a small number of carbon atoms and can in fact vary up to twenty or more carbon atoms, thereby imparting hydrophobic characteristics to the mineral-coupler bond and the coupler-polymer bond. Suitable acid compounds include: propiolic acid, phenyl propiolate, methyl butynoate, isopropyl tetrolate, benzyl ester of 3-hexynoic acid, p-tolyl ester of 2-tetradecynoic acid, and cyclohexyl ester of 9-decynoic acid.

The silane and alkynoic acid compound when combined in the presence of chloroplatinic acid or a similar catalyst produce an exothermic reaction. Control of the reaction is achieved by adding one of the reactants, such as the silane, to the other reactant in a dropwise manner with stirring. It may become necessary, particularly if a low molecular weight acid compound is used, to provide cooling means during the dropwise addition to prevent loss of the acid compound through volatilization. After combination of the reactants, it may be desirable to heat the reactant mixture for a period of time to increase the product yield. Gentle refluxing for a few hours has proved advantageous. The carboxylalkenyl halosilane product is separated from the reaction mixture by fractional distillation under reduced pressure, the temperature at which the silane product distills being determined by the pressure within the distillation flask and by the particular silane produced.

Polymers useful in the production of reinforced compositions according to this invention are those synthetic resins which can react with carboxyalkenyl groups or which are formed from monomers which can react with the carboxylalkenyl halosilanes. Included are monomeric acids, alcohols, esters, amines, imides, amides, lactams, and isocyanates capable of reacting with the carboxyl group of the coupler. Cyclic and olefinic monomers such as ethylene, propylene, butadiene, styrene, and unsaturated polyester prepolymers can react with the double bond of the alkenyl chain and thereby interpolymerize with the coupler through an addition reaction. Other polymer systems utilizing a promoter, regulator, inhibitor, stabilizer, or other additive which is chemically incorporated into the polymer chain upon polymerization can also be used in this invention if the additive contains functional groups which are also reactive with the carboxylalkenyl halosilane coupler. Examples of poylmer systems useful in the subject invention include polyamides such as nylon 6, nylon 6,6, and higher polyamides, phenol-formaldehyde resins, melamines, polyurethanes, polyglycols, styrene-maleic anhydride copolymers, polycarbonate resins, epoxy resins, and the polystyrene resins.

Fillers useful herein are those inorganic materials capable of retaining their discrete shape when subject to the polymer processing techniques described herein as well as conventional processing techniques. Suitable fillers are selected from a wide variety of minerals, primarily metals, metal oxides, metal salts such as metal aluminates and metal silicates, other siliceous materials, and mixtures thereof. Generally, those materials which form an alkaline surface upon treatment with a base are best suited for the polymeric composition of this invention. Since metal silicates and siliceous materials readily acquire the desired alkaline surface, a preferred mineral mixture for use in this invention is one which contains a major amount, i.e. more than 50% by weight, of metal silicates or siliceous materials. Materials with such characteristics are preferred because of the ease with which they are coupled to the polymer. However, other substances such as alumina, $Al_2O_3$, which are coupled to a polymer only at higher levels of coupling agents, can nevertheless be used as a reinforcing component at more economically acceptable coupler concentrations if combined with other minerals which are more susceptible to coupling, and more preferably combined in minor amount, i.e. percentages of less than 50% of the total filler. An example of such a material useful as a filler with which alumina can be mixed is feldspar, an igneous crystalline mineral containing about 67% $SiO_2$, about 20% $Al_2O_3$, and about 13% alkali metal and alkaline earth metal oxides. Feldspar is one of the preferred fillers of this invention and a feldspar-alumina mixture is also useful. Other materials particularly preferred as fillers are those materials having an alkaline surface such as wollastonite, which is a calcium metasilicate; asbestos such as chrysotile, a hydrated magnesium silicate; crocidolite; and other calcium magnesium silicates. Other useful fillers include: quartz and other forms of silica, such as silica gel, glass fibers, cristobalite, etc.; metals such as aluminum, tin, lead, magnesium, calcium, strontium, barium, titanium, zirconium, vanadium, chromium, manganese, iron, cobalt, nickel, copper, and zinc; metal oxides in general, such as oxides of aluminum, tin, lead, magnesium, calcium, strontium, barium, titanium, zirconium, vanadium, chromium, manganese, iron, cobalt, nickel, copper and zinc; heavy metal phosphates, sulfides and sulfates in gel form; and minerals and mineral salts such as spodumene, mullite, mica, montmorillonite, kaolinite, bentonite, hectorite, beidellite, attapulgite, chrysolite, garnet, saponite and hercynite.

The amount of filler to be used in the preparation of the polymeric compositions varies over a wide range with the maximum content being limited primarily by the ability of the polymer to bind the reinforcing medium into a cohesive mass. Techniques subsequently described herein have enabled me to prepare polymeric compositions containing as much as 90 or 95% by weight filler.

The lower range of filler concentration is limited only insofar as it is necessary to have sufficient mineral present to effect an improvement in physical properties of the polymeric composition. Consequently, mineral concentrations as low as 5% by weight or less can be use, particularly if the finished composition has been extruded into filament form. A preferable lower limit for the mineral reinforcing agent, especially in the case of molded compositions, is 40% by weight of the total composition, and more preferably 50% by weight. Suitable values, therefore, for filler concentration in the finished composition range from about 5 to 95%, preferably from about 40 to 95%, and more preferably from about 50 to 90% by weight.

Particle shape and size of the filler affect the physical properties of the finished composition. In a preferred aspect of this invention, the filler is admixed with a monomer or prepolymer and subsequently cast into a mold where the polymer is formed and cured. In such a method, the viscosity of the monomer or prepolymer-filler slurry becomes a limitation on the maximum amount of filler which can be used, i.e. too high a filler concentration produces mixture too viscous to cast into molds. This limitation on filler concentration imposed by the viscosity is in turn dependent upon the shape of the particulate filler. For example, spherical particles do not increase the viscosity of the monomer mixture as much as fibrous material. By adjusting the particle shape of a mineral reinforcer and thereby controlling the viscosity of the monomer mixture, it is possible to prepare improved castable or moldable polymeric compositions containing a very large amount of reinforcing mineral.

Another factor which has an effect on the upper limit of mineral concentration is a particle size distribution of the mineral. A wide distribution of particle sizes provides a composition with a small amount of voids or spaces between the particles, thereby requiring less polymer to fill these spaces and bind the particles together. Proper combination of the two variables of particle shape and size distribution permits the preparation of highly reinforced compositions.

Particle size distribution as previously noted, is a variable which has an effect on the degree of filler loading possible. Regarding particle size, generally particles which pass through a 60 mesh screen are small enough to be used in the compositions of this invention, although particles as large as 1000 microns (18 mesh) can be used with equal or nearly equal success; regarding a lower limit on particle size, particles as small as 0.5 micron have been successfully employed and particles in the 200 to 400 m$\mu$ range can also be used. More descriptive of suitable filler particles than limits on particle size is a specification of particle size distribution. A suitable wide particle size distribution is as follows:

|  | Percent |
|---|---|
| 250 microns or less (60 mesh) | 100 |
| 149 microns or less (100 mesh) | 90 |
| 44 microns or less (325 mesh) | 50 |
| 5 microns or less | 10 |

A narrower distribution also suitable for use in this invention is:

|  | Percent |
|---|---|
| 62 microns or less (230 mesh) | 100 |
| 44 microns or less (325 mesh) | 90 |
| 11 microns or less | 50 |
| 8 microns or less | 10 |

A relatively coarse mixture useful in this invention has the following particle size distribution:

|  | Percent |
|---|---|
| 250 microns or less (60 mesh) | 100 |
| 149 microns or less (100 mesh) | 90 |
| 105 microns or less (140 mesh) | 50 |
| 44 microns or less (325 mesh) | 10 |

A suitable finely divided mixture has the following particle size distribution:

|  | Percent |
|---|---|
| 44 microns or less (325 mesh) | 100 |
| 10 microns or less | 90 |
| 2 microns or less | 50 |
| 0.5 micron or less | 10 |

These figures regarding particle size distribution should not be construed as limiting since both wider and narrower ranges of distribution will also be useful as well as both coarser and finer compositions. Rather these figures are intended as representative illustrations of filler compositions suitable for use in the reinforced polymeric compositions of this invention.

The filler performs a dual function in the finished compositions. First, depending upon the material selected, it may serve as an inexpensive diluent for the polymer, thereby lowering the cost of the final product. Secondly, and more important, the filler, when bound to the polymer in accordance with this invention, produce compositions with mechanical properties far superior to those of unreinforced polymers, thereby permitting their use in applications heretofore unsuited for the unreinforced polymers.

To achieve the benefits of this invention, namely the production of easily castable or moldable highly reinforced polymeric compositions plus lower costs from higher loadings of reinforcing minerals, it is necessary that the reinforcing agent be substantially particulate in shape rather than fibrous. However, a small amount of fibrous material may be incorporated into a polymer system if the amount of granular material is reduced by some proportionately larger amount. Alternatively, if castability is not required, larger amounts of fibrous material can be included in the composition, thereby reinforcing the final product to an even greater extent.

The most common fibrous reinforcing agent used is fibrous glass particles. These fibers are most easily incorporated into the polymeric compositions when chopped into strands approximately 0.1 to 3.0 inch in length, and then either added to a prepolymer-coupler mixture as discrete particles or formed into a mat upon which the prepolymer is poured prior to polymerization. Such methods of incorporation of glass fibers are well known in the art and are mentioned here to demonstrate that the particulately reinforced polymers of this invention can be additionally reinforced by incorporation of fibrous materials according to techniques well known in the art or according to the procedure described herein as applicable to particulate fillers.

Bonding of the reinforcing medium to the polymer is achieved by means of a carboxylalkenyl halosilane containing at least one alkenyl carboxyl radical for reaction with a monomeric system during polymerization or a polymer system and at least one halogen radical for reaction with the filler. The filler and coupler are joined by mixing them in an aqueous or anhydrous medium. Theoretically, the halogen radicals react with hydroxyl groups appended to the filler surface. When a siliceous filler is employed, it is suggested that a halogen acid is formed together with the very stable siloxane linkage,

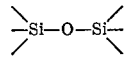

In some situations, a suspension of filler in aqueous medium is advantageous in achieving good contact of filler and coupler, especially if the filler is in very finely divided form. In such a case, the halosilane may be first converted to a silanol, i.e.

which can then react with surface hydroxyl groups of a siliceous filler to produce the siloxane linkage. The reluctance of some materials, such as alumina, to acquire surface hydroxyl groups may explain why they are not as readily bound to the polymer. Alumina is preferably mixed with siliceous materials to produce compositions of high strength and modulus. Regardless of any theoretical explanation advanced herein, to which there is no intent to be bound, an adherent bond of coupler to filler is formed by placing them in contact with each other. This bonding of filler and coupler may be carried out separately, and the coupler-filler adduct subsequently added to the monomer system; or the reaction may be carried out in the presence of the monomer prior to polymerization; or the coupler may be bound to the polymer during a polymerization, thereby producing a polymer with appended filler reactive groups which may subsequently be reacted with the filler to produce a reinforced composition.

The amount of coupler with which the filler is treated is relatively small. As little as one gram of coupling agent per 1000 grams of filler produces a polymeric composition with physical properties superior to those of a polymeric composition containing an untreated filler. Generally, quantities of coupler in the range of 3 to 20 grams per 1000 grams of filler have been found most satisfactory although quantities in excess of that range may also be used with no detriment to the properties of the finished product.

Polymerizations are carried out by methods well known to those skilled in the art using appropriate catalysts, promoters, regulators, stabilizers, curing agents, etc., necessary to achieve the polymerization of a selected monomer or monomers.

Regarding the preparation of castable compositions, it may be advisable, particularly in the case of high loadings of reinforcing agents where a slight increase in viscosity of the monomer-mineral mixture cannot be tolerated, to provide means for injection of the catalyst (or alternately the promoter) into the monomer as it is being poured into the mold. Such a technique completely prevents an increase in viscosity of the monomer mixture due to polymerization before the mixture is cast. Another technique useful with high loadings of fillers which aids in overcoming the difficulties presented by high viscosity is a pressurized injection of the monomer mixture into the mold.

A technique which has been found useful in decreasing the viscosity of monomer-filler slurries comprises adding a small amount of a surface-active agent to the slurry. A decrease in viscosity is advantageous for two reasons. It permits the formation of a finer, smoother finish on the final product. Occasionally a finished composition with a high content of filler, e.g. 75% may have a granular or coarse texture and may even contain voids or open spaces due to the inability of the viscous mixture to flow together completely prior to polymerization. The addition of a surface-active agent eliminates this problem and produces a smooth, attractive finish on highly reinforced compositions. Alternatively if a smooth finish is not a necessary feature for certain applications, then a decrease in viscosity permits incorporation of larger amounts of filler into the monomer feed. The surface-active agent may be either anionic, cationic, nonionic or mixtures thereof. Examples include zinc stearate, dioctadecyl dimethylammonium chloride, and ethylene oxide adducts of stearic acid. Preferred compounds are the metal and quaternary ammonium salts of long-chain carboxylic acids. A concentration of surfactant in the range of 0.05 to 0.5% by weight of the total composition has been found useful. However, concentrations lower than 0.05% can also be used with somewhat diminished results. At concentrations higher than 0.5% it may be necessary to use additional catalyst and promoter in some systems.

Such techniques, either singly or in combination with one another, are useful in obtaining the highly reinforced compositions of this invention.

Processing and molding techniques applicable to unfilled or unreinforced polymeric systems can be used in the practice of this invention. For instance, compression molding, transfer molding, injection molding and blow molding are not rendered inoperative because of the presence of coupler and reinforcing agent.

Utilization of the procedures described above and in the following examples permits the preparation of granularly reinforced polymeric compositions possessing flexural strengths at least 25% greater than the corresponding unreinforced polymers. Since the flexural strength of most prior art filled polymers do not increase and often decreases with increasing concentrations of filler above 50%, even more significant improvement is achieved at higher filler concentrations, e.g. 60% and greater.

The invention will be more clearly understood from the detailed description of the following specific examples which set forth some of the preferred coupling agents and their method of preparation, some of the preferred polymeric compositions, the methods of preparing them, and the superior mechanical properties attained by the practice of this invention.

Example 1

To a quantity of 63.0 grams of butyl propiolate, 2.0 ml. of a 0.1 M solution of chloroplatinic acid, $H_2PtCl_6 \cdot 2H_2O$, in isopropyl alcohol is added. To this mixture 105.0 grams of methyldichlorosilane is added dropwise with stirring. The dropwise addition is regulated to maintain a reaction temperature of about 75° to 85° C. After addition of the silane, the reactant mixture is allowed to stand overnight and subsequently distilled at 3 mm. Hg absolute pressure. That portion distilling at 88° to 92° is collected and identified as n-butyl-β-(methyldichlorosilyl)acrylate. Infrared analysis confirms this structure. The yield is 75.0 grams which represents a 62% yield. Subsequent preparations have produced 80% yields. Elemental analysis is as follows: C=40.23%, H=5.87%, Cl=29.20%, Si=11.57%. Calculated for $C_8H_{14}Cl_2O_2Si$: C=39.80%, H=5.82%, Cl=29.85%, Si=11.61%.

Example 2

To 30.0 grams of n-butyl propiolate is added 2.0 ml. of a 0.1 M solution of chloroplatinic acid in isopropyl alcohol. To this mixture 45.0 grams of trichlorosilane is added dropwise with stirring. The temperature of the reactant mixture is maintained below 110° C. by external cooling. After addition of the silane, the mixture is refluxed around 50° C. for 6 hours. The mixture is distilled under reduced pressure (5 mm. Hg) and the fraction distilling at 77° to 79° C. is collected and identified as n-butyl-β-trichlorosilyl acrylate. Elemental analysis confirms the formula assigned to this product.

Example 3

A quantity of 400 grams of ε-caprolactam is melted in a flask under an atmosphere of dry nitrogen. To this melt is added with stirring 650 grams of wallostonite and 6.5 grams of n-butyl-β-(dichloromethylsilyl)acrylate. The mixture is heated to 150° C. under a slight vacuum to remove HCl and the distillation continued until 50 grams of caprolactam is also removed. The vacuum is replaced with an atmosphere of dry nitrogen and the mixture allowed to cool to 115° C.; then 4.9 grams of an 80/20 blend of 2,4- and 2,6-diisocyanatotoluene (TD–80) is added and mixed for several minutes. To this mixture, 8.3 ml. of a 3 molar solution of ethylmagnesium bromide in diethyl ether is added slowly with stirring. Again a vacuum is applied until all the ether and ethane are removed, as evidenced by the complete dispersal of the catalyst in the mixture. After release of the vacuum, the slurry is poured into a mold preheated to 200° C. and maintained at 200° C. for one hour.

Example 4

The procedure described in Example 3 is followed except that n-butyl-β-trichlorosilyl acrylate is used as the coupling agent instead of n-butyl-β-(methyldichlorosilyl)-acrylate.

Example 5

To 25 grams of ethyl propiolate is added 2.0 ml. of a 0.1 M solution of chloroplatinic acid in isopropanol. To this mixture 45 grams of trichlorosilane is added dropwise with stirring. The temperature of the reactant mixture is maintained below 110° C. by external cooling. After addition of the silane, the mixture is refluxed for about four hours. The mixture is distilled under reduced pressure (2 mm. Hg) and the fraction distilling at 53 to 55° C. is collected and identified as ethyl-β-trichlorosilyl acrylate. Elemental analysis confirms the formula of this compound.

The procedure described in Example 3 was followed except that 6.5 grams of ethyl-β-trichlorosilyl acrylate was used as the coupling agent and the polymerization of the monomer-mineral mixture was carried out at 175° C. for two hours.

Example 6

A caprolactam polymerization was carried out in the same manner as described in Example 5 except that only 2.3 grams of ethyl-β-trichlorosilyl acrylate was used instead of 6.5 grams.

Table I below gives fluxural strengths and flexural moduli values for the polymeric compositions of this invention. The flexural strength and modulus values are determined in accordance with A.S.T.M. test D 790–61. Values for wet strength and modulus were measured on samples subjected to a four hour immersion in boiling water. Composition A is an unfilled, unreinforced polycaprolactam prepared according to Example 3 above except that no reinforcing agent or coupling agent was used. Composition B is a filled polycaprolactam prepared according to Example 3 except that no coupling agent was used. The numerical designations of polymeric compositions indicate compositions prepared in the manner described in the corresponding examples.

| Polymeric Composition | Dry | | Wet | |
|---|---|---|---|---|
| | Flexural Strength, p.s.i. | Flexural Modulus, p.s.i. | Flexural Strength, p.s.i. | Flexural Modulus, p.s.i. |
| A | 12,000 | 0.30×10⁶ | 3,300 | 0.09×10⁶ |
| B | 19,700 | 1.55 | 6,400 | 0.41 |
| 3 | 25,600 | 1.82 | 13,800 | 0.79 |
| 4 | 25,100 | 2.10 | 10,900 | 0.65 |
| 5 | 22,200 | 1.90 | 13,700 | 0.83 |
| 6 | 21,000 | 1.79 | 14,700 | 0.89 |

The above table demonstrates the improved mechanical properties achieved by the coupling capability of the carboxylalkenyl halosilanes. Dry flexural strengths are improved by more than 25% over the filled compositions and the wet strength is improved to an even greater extent. In addition, the rigidity of the polymeric compositions, as measured by the flexural modulus, is also improved both in the dry and wet samples.

Example 7

A quantity of 190 grams of wollastonite is treated with 2.0 grams of ethyl 12-(trichlorosilyl)tetradecenoate in the presence of water. The water is removed from the treated mineral by vacuum distillation at 130° to 140° C. The wollastonite-tetradecenoate adduct is added to a 1 liter solution of pyridine containing 114 grams of Bisphenol A. With the temperature of the solution maintained at 25° to 35° C., phosgene is introduced at the rate of 5 grams per minute with vigorous stirring. After 10 minutes, the viscosity of the solution is increased substantially and the introduction of phosgene is stopped. The product, a low-molecular weight polycarbonate reinforced with wollastonite, is precipitated from the solution by the addition of methanol. A quantity of 10 grams of maleic anhydride is then blended into the polymer and the mixture compression-molded at 250° C. and 2000 p.s.i. for 15 minutes. The finished product contains 51% reinforcing agent. This reinforced polycarbonate resin has mechanical properties substantially superior to an unreinforced polycarbonate resin.

The improved mechanical properties of the reinforced polymers permit their use in many applications in which the unreinforced polymers are unsuitable, such as the fabrication of tables, chairs, and other furniture and funiture components, heavy duty equipment housings, automobile components, and building construction components. Further, the compositions of this invention are generally useful in those applications in which unreinforced polymers have been useful but where increased strength and rigidity are desirable features. The carboxylalkenyl halosilanes are useful in producing reinforced polymers.

Although the invention has been described in terms of specified embodiments which are set forth in considerable detail, it should be understood that this was done for illustrative purposes only, and that the invention is not necessarily limited thereto since alternative embodiments and operating techniques will become apparent to those skilled in the art in view of this disclosure. For instance, these compositions can be "filled" with a mineral filler, i.e. with additional inorganic particulate material which is not chemically bound to the polymer as is the reinforcing agent. As an example, a mold may be loosely filled with a mixture of large (approximately 1 centimeter in diameter) irregular mineral particles and sand, and a monomer-mineral slurry as described in the preceding examples can be poured into the mold, thereby "wetting" the large particles in the mold and filling the spaces between the particles before polymerization occurs. In such a case the reinforced polymer binds the sand and larger aggregates together in much the same way that cement binds sand and gravel together to form a finished concrete. As an alternate method, the mineral aggregate in the mold can be treated with a suitable coupling agent prior to the introduction of the monomer-mineral slurry so that upon casting, the entire mineral mixture is chemically bound to the polymer, thereby producing a reinforced composition wherein the reinforcing medium can exceed 95% of the total composition. Similarly, cellulosic fibers can be incorporated into the polymers of this invention and coupled thereto by the couplers described above. If appreciable quantities of cellulosic fibers are added, the properties of the finished article will be modified considerably by comparison to an article containing no cellulosic filler. The basic reinforcing character of the filler-coupler-polymer composition will nevertheless remain manifest. Accordingly, these and other modifications are contemplated which can be made without departing from the spirit of the described invention.

What is claimed is:

1. A reinforced polymeric composition comprising a polymer reactable with a carboxylalkenyl group or formed from a monomer reactable with a carboxylalkenyl group, from about 5 to about 95% by weight based on the total composition of an inorganic filler, and at least about 0.1% by weight based on the filler of a carboxylalkenyl halosilane of the formula

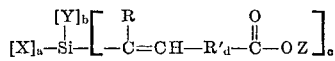

wherein X is a halogen radical, Y and Z are selected from the group consisting of hydrogen and hydrocarbyl radicals, R is selected from the group consisting of hydrogen and alkyl radicals, R' is an alkylene radical, $a$ is an integer from 1 to 3, $b$ is an integer from 0 to 2, $c$ is an integer from 1 to 3, provided that the sum of $a+b+c$ equals 4, and $d$ is an integer from 0 to 1.

2. A reinforced polymeric composition according to claim 1 wherein said carboxylalkenyl halosilane is limited as follows:

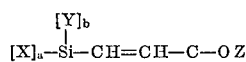

wherein X is selected from the group consisting of fluoro, chloro, and bromo radicals, Y and Z are alkyl radicals, $a$ is an integer from 2 to 3, and $b$ is an integer from 0 to 1, provided that the sum of $a+b$ equals 3.

3. A reinforced polymeric composition comprising a polyamide, from about 5 to 95% by weight based on the total composition of an inorganic filler, and at least about 0.1% by weight based on the filler of an alkyl β-(methyldichlorosilyl) acrylate.

4. A reinforced polymeric composition comprising a polyamide, from about 5 to about 95% by weight based on the total composition of an inorganic filler, and at least about 0.1% by weight based on the filler of an alkyl β-(trichlorosilyl) acrylate.

5. A reinforced polymeric composition comprising a polyamide, from about 5 to about 95% by weight based on the total composition of an inorganic filler, and at least about 0.1% by weight based on the filler of n-butyl-β-(methyldichlorosilyl) acrylate.

6. A reinforced polymeric composition comprising a polyamide, from about 5 to about 95% by weight based on the total composition of an inorganic filler, and at least about 0.1% by weight based on the filler of n-butyl-β-(trichlorosilyl) acrylate.

7. A reinforced polymeric composition comprising a polyamide, from about 5 to about 95% by weight based on the total composition of an inorganic filler, and at least about 0.1% by weight based on the filler of ethyl-β-(trichlorosilyl) acrylate.

8. A reinforced polymeric composition comprising a polyamide, from about 50 to about 90% by weight based on the total composition of an inorganic filler, and at least about 0.1% by weight based on the filler of a carboxylalkenyl halosilane of the formula

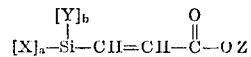

wherein X is selected from the group consisting of fluoro, chloro, and bromo radicals, Y and Z are alkyl radicals, $a$ is an integer from 2 to 3, and $b$ is an integer from 0 to 1, provided that the sum of $a+b$ equals 3.

9. A process of preparing a reinforced polymeric composition comprising
(a) contacting an inorganic filler with at least about 0.1% by weight based on the filler of a carboxylalkenyl halosilane of the formula:

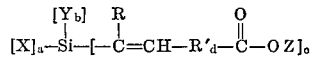

wherein X is a halogen radical, Y and Z are selected from the group consisting of hydrogen and hydrocarbyl radicals, R is selected from the group consisting of hydrogen and alkyl radicals, R' is an alkylene radical, $a$ is an integer from 1 to 3, $b$ is an integer from 0 to 2, $c$ is an integer from 1 to 3, provided that the sum of $a+b+c$ equals 4, and $d$ is an integer from 0 to 1, to prepare a filler adduct, and
(b) conducting a polymerization of a monomer system reactable with said filler adduct in the presence of said filler adduct, said adduct being present in an amount from about 5 to about 95% by weight of the total composition.

10. A process according to claim 9 wherein the filler adduct is formed in the presence of the monomer.

11. A process according to claim 9 wherein the filler adduct is formed prior to addition of the monomer.

12. A process of preparing a reinforced polymeric composition comprising:
(a) contacting an inorganic filler with at least about 0.1% by weight based on the filler of a carboxylalkenyl halosilane of the formula

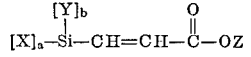

wherein X is selected from the group consisting of fluoro, chloro, and bromo radicals, Y and Z are alkyl radicals, $a$ is an integer from 2 to 3, and $b$ is an integer from 0 to 1, provided that the sum of $a+b$ equals 3, to prepare a filler adduct, and
(b) conducting a base-catalyzed, substantially anhydrous polymerization of ε-caprolactam in the presence of said filler adduct, said adduct being present in an amount from about 5 to about 95% by weight of the total composition.

13. A process of preparing a reinforced polymeric composition comprising:
(a) contacting an inorganic filler with at least about 0.1% by weight based on the filler of an alkyl-β-(methyldichlorosilyl) acrylate to prepare a filler adduct, and
(b) conducting a substantially anhydrous, base-catalyzed polymerization of ε-caprolactam in the presence of said filler adduct, said adduct being present in an amount from about 5 to about 95% by weight of the total composition.

14. A process of preparing a reinforced polymeric composition comprising:
  (a) contacting an inorganic filler with at least about 0.1% by weight based on the filler of an alkyl-$\beta$-(trichlorosilyl) acrylate to prepare a filler adduct, and
  (b) conducting a base-catalyzed, substantially anhydrous polymerization of $\epsilon$-caprolactam in the presence of said filler adduct, said adduct being present in an amount from about 5 to about 95% by weight of the total composition.

References Cited

UNITED STATES PATENTS

| 3,079,361 | 2/1963 | Plueddemann. |
| 3,328,339 | 6/1967 | Tierney. |
| 3,344,107 | 9/1967 | Miller. |

MORRIS LIEBMAN, Primary Examiner

L. T. JACOBS, Assistant Examiner

U.S. Cl. X.R.

260—38, 39, 41

PO-1050
(5/69)

UNITED STATES PATENT OFFICE
CERTIFICATE OF CORRECTION

Patent No. 3,471,435　　　　　　　　　Dated October 7, 1969

Inventor(s) Robert E. Miller

It is certified that error appears in the above-identified patent and that said Letters Patent are hereby corrected as shown below:

In the Abstract of the Disclosure (in the formula)

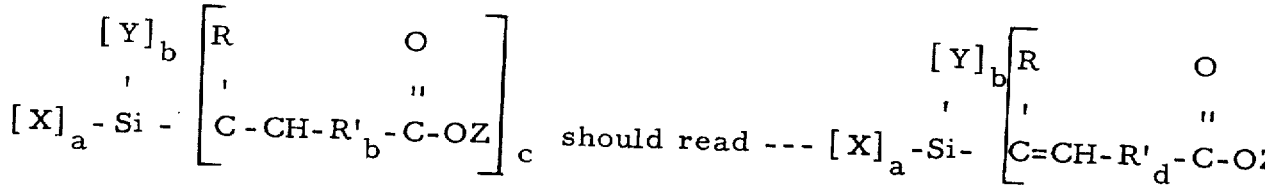

Column 1, line 69, "improved" should read --- improvement ---.
See specification, page 2, line 16.

Column 2, line 53, "group" should read --- groups ---.
See specification, page 4, line 2.

Column 4, line 75, "composition" should read --- compositions ---.
See specification, page 8, line 13.

Column 5, line 14, "amount" should read --- amounts ---.
See specification, page 8, line 23.

Column 5, line 52, "use" should read --- used ---.
See specification, page 9, line 23.

Column 5, line 69, "mixture" should read --- mixtures ---.
See specification, page 10, line 8.

SIGNED AND
SEALED
MAY 26 1970

(SEAL)
Attest:

Edward M. Fletcher, Jr.
Attesting Officer

WILLIAM E. SCHUYLER, JR.
Commissioner of Patents